United States Patent [19]
> Shoemaker

[11] 4,003,486
[45] Jan. 18, 1977

[54] APPARATUS FOR LOADING AND UNLOADING A BOAT ONTO A MOTOR VEHICLE

[76] Inventor: Clifford L. Shoemaker, 20632 3rd Ave. S., Seattle, Wash. 98148

[22] Filed: Aug. 11, 1975

[21] Appl. No.: 600,617

[52] U.S. Cl. ............................ 214/450; 214/152
[51] Int. Cl.² ............................................ B60P 3/10
[58] Field of Search ............. 214/77 R, 450, 500, 214/152; 9/39; 224/42.1 H

[56] References Cited
UNITED STATES PATENTS

| | | | |
|---|---|---|---|
| 3,387,727 | 6/1968 | Micheel | 214/450 |
| 3,716,156 | 2/1973 | Risney | 214/450 |
| 3,878,954 | 4/1975 | Jessee | 214/450 |
| 3,885,689 | 5/1975 | Grove et al. | 214/450 |
| 3,894,643 | 7/1975 | Wilson | 214/450 |

Primary Examiner—L. J. Paperner
Attorney, Agent, or Firm—Roy E. Mattern, Jr.

[57] ABSTRACT

A mechanism to raise a small boat or other craft to the top of an automobile or recreational vehicle and to position the boat to be secured for transporting. A telescoping support beam is attached to structure on the rear of the carrier vehicle by a pivotal connection and is slidably adjusted to its first preselected length, corresponding to the vehicle height, and then connected by its opposite end to a bracket attached to the bow of the boat. The telescoping support beam then acts as a rigid restraint, which swings through a 90° arc with only one degree of freedom, to control and partially support the boat as its bow is raised by a winch and pull rope. With the bow of the boat resting on a conventional roof top supporting frame, the telescoping support beam in disconnected from the boat bow and slidably extended to reach the stern of the boat, where the beam and pull rope are reconnected. The winch is then operated to slide the boat stern forward, slidably compressing the beam until a stop collar is reached at the first pre-selected beam length, corresponding to the vehicle height. The beam is then secured by a lock screw and further operation of the winch raises the stern of the boat. The beam again passes through a 90° arc, raising the boat stern, to finally position the craft on the top of the vehicle where it is secured for transportation.

When these steps are undertaken in reverse order, unloading of the boat is accomplished, safely lowering the boat to the ground, again without requiring physical exertion by the single vehicle operator.

11 Claims, 11 Drawing Figures

1

APPARATUS FOR LOADING AND UNLOADING A BOAT ONTO A MOTOR VEHICLE

BACKGROUND OF THE INVENTION

The popularity of aquatic activities such as fishing, water skiing and sailing has resulted in the purchase of small boats by many families and by sportsmen. To enable these people to transport their boats atop their automobiles or recreational vehicles and thus avoid the additional expense of a trailer which is also inconvenient to pull, many boat loading devices have been invented. It is a common practice to transport small boats upside down on a pair of transverse support bars or other supporting structure on the roof of a motor vehicle. Without a lifting device, the boat must be physically lifted into place by the vehicle operator and may require the aid of other people. On lighter weight boats, one person might be able to position the boat but with only one person lifting, it is possible to lose control of the boat and damage may result to the vehicle and possibly injure the person lifting.

The present invention is an improvement over the numerous boat loading devices disclosed in the prior art, and efficiently raises and positions a boat on top of a carrier without requiring any lifting or strenuous physical exertion by the vehicle operator, who can safely load or unload a boat from his vehicle by himself.

Several boat loading devices have been devised which raise or support the stern end of a boat but require the bow to be manually lifted and pivoted to rest on the boat support frame on the top of the vehicle. The invention of C. J. Shaw, U.S. Pat. No. 3,044,643 illustrates such a device which is used to raise and position the stern but requires one or two men to lift and rotate the bow of the boat to its supported position on top of the vehicle.

Other inventions, such as those by Grimshaw, U.S. Pat. No. 2,889,950 and Evans, U.S. Pat. No. 3,750,812 raise and position a boat on the top of a recreational vehicle without requiring the vehicle operator to manually lift or support the boat; however, additional specially constructed guides and centering means and a complicated positioning platform are needed to permit one man to safely raise and position the boat on the carrier vehicle. The present device only requires the inventor's novel telescoping support, used with a conventional winch an pull rope and attachment brackets to position a boat atop a standard car top support frame, and is thus an improvement in economy and efficiency.

The invention of F. J. Sutton, U.S. Pat. No. 3,435,970, is used to raise a boat from ground level to a vehicle roof in one motion; however it swings the entire length of the boat through a 180° arc while raising it to the level of the vehicle roof. The present invention moves the boat more safely and efficiently and through a smaller, translational range of motion and does not require the mounting of a winch or other hardware on the front of the carrier vehicle where it might obstruct the driver's vision. With minimal hardware this invention safely and efficiently facilitates movement of the boat to or from the car top support frame as the telescoping support beam rigidly supports and restrains the boat as it is loaded or unloaded.

SUMMARY OF THE INVENTION

A boat loading and positioning device is disclosed herein to raise a boat from ground level and place it on a conventional support rack on top of an automobile or other carrier vehicle such as a camper or pickup truck or recreational vehicle. The boat is positioned on top of the vehicle or removed and lowered to ground level by one man, such as the carrier vehicle operator, without requiring manual lifting or support of the boat's weight as it is raised or lowered. To avoid the serious danger of loss of control of the boat as it is raised and the resulting property damage and personal injury which might occur, a telescoping support beam and its associated winch and pull rope act as restraints which support the boat and prevent it from sliding off the side of the carrier vehicle.

The telescoping support beam is bolted to a pivotal connection at or near the center of the vehicle rear bumper and is free to swing in a vertical plane which passes through the center line of the vehicle. The pivotal connection to the vehicle bumper permits only 1 degree of freedom, so that the beam acts to prohibit motion except along the carrier vehicle center line. Slidable, concentric tube construction allows the beam to vary in length by a telescoping action and locking means are used to fix the beam at a desired length. A slidable collar can be locked at an appropriate position on the smaller concentric tube to limit the minimum length of the telescoping beam at a pre-selected position. This pre-selected, minimum length is determined by the height of the carrier vehicle roof and the beam is adjusted so that it just reaches the boat support rack and is thus calibrated to support the boat at the correct height when it is raised to roof top level.

Commencing with the boat on the ground directly in line with the truck, but spaced to the rear, the telescoping support beam is connected by a slidable pin to a bracket which has been clamped to the bow of the boat. A winch drawn pull rope is secured to the bean near the bow of the boat and as the winch is operated the bow of the boat is drawn upward. A second bracket attached to the stern of the boat acts as a skid as the boat slides forward and its bow is raised. In a preferred embodiment, one or more wheels may be attached to the rear skid to allow the boat stern to roll forward. When the beam has swung through a 90° arc to a vertical position, the pre-selected beam length will position the boat bow to rest on the transverse boat support frame mounted to extend slightly to the rear of the vehicle roof. The beam is now disconnected from the bow bracket and the locking screw is released to permit the beam to be slidably extended to reach the stern bracket where the beam and pull rope are reconnected. As the pull rope is again drawn in by the winch, the boat stern slides on the stern skid toward the carrier vehicle, compressing the telescoping beam until the slidable stop collar is reached at the pre-selected minimum beam length which corresponds to the height of the carrier vehicle roof. The locking screw is then re-tightened, fixing the beam at the pre-selected length, and further operation of the winch raises the stern of the boat to the vehicle roof support rack. The beam once again passes through a 90° arc to a vertical position where it supports the boat stern at the exact height of the support rack. As the boat nears its resting position atop the vehicle, the pre-selected boom length causes the boat to pivot smoothly to lower the bow to the front transverse support rack. The securing clamps on the support rack also act as guides to aid in keeping the boat centered as it is pulled forward across the rear transverse support frame. After the boat has been smoothly and quickly raised to its position on the roof of the carrier vehicle it is secured to be transported.

A reversal of these steps permits the boat to be safely lowered to the ground while being supported and restrained by the winch drawn pull rope and the telescoping beam.

DRAWINGS OF PREFERRED EMBODIMENTS

FIG. 1 is an environmental view of the boat loader illustrating a boat connected to the support beam and about to be loaded onto the roof of the carrier vehicle.

In FIGS. 2 thru 8, the sequence of steps to raise the boat to the roof of the carrier is shown. If performed in reverse order, these steps can be used to lower the boat to ground.

FIG. 9 illustrates a perspective view of the telescoping support beam used to restrain and partially support the boat during loading and unloading.

In FIG. 10, a cutaway view of the boat illustrates the attachment of the stern mounting bracket to the boat.

In FIG. 11, the bow of the boat is drawn in phantom lines and the bow bracket is shown clamped to the boat and connected to the supporting beam and pull rope.

DESCRIPTION OF PREFERRED EMBODIMENTS

Figure 1:
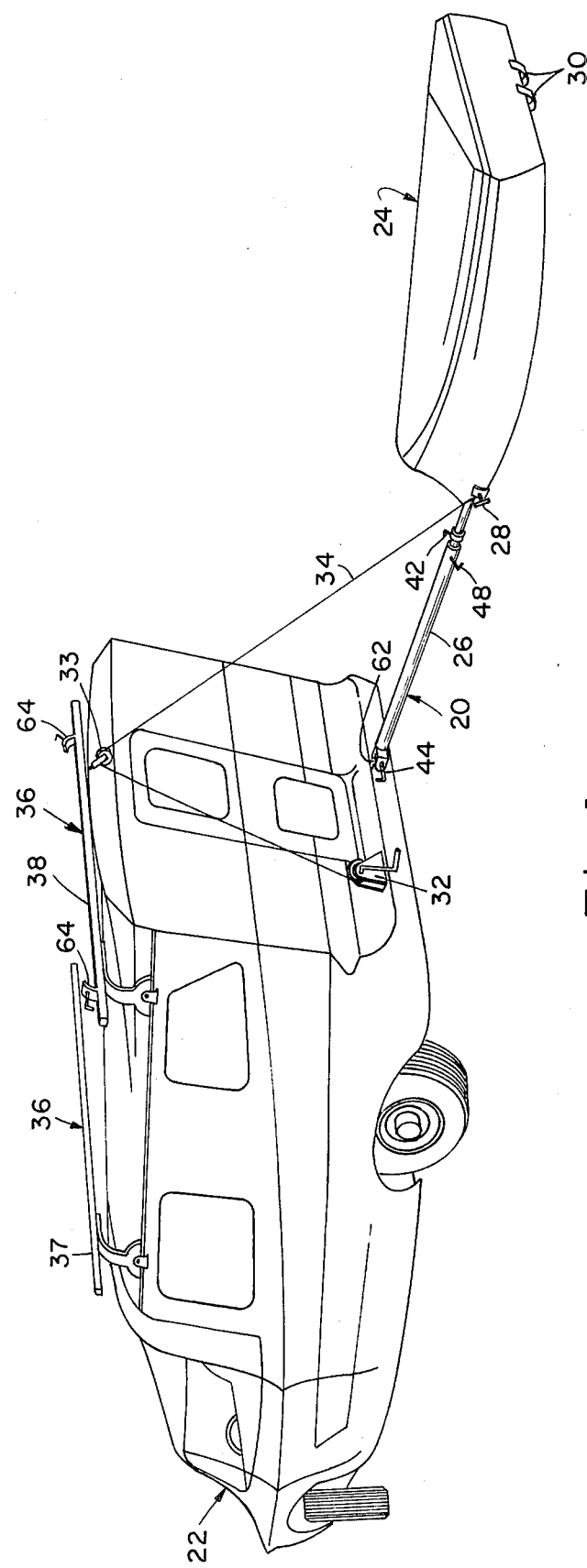

In FIG. 1 a recreational vehicle is shown with a boat positioned to be loaded onto the conventional carrying rack 36 on the vehicle roof. The boat has been placed face down in line with and to the rear of the carrier vehicle which may be an automobile or camper, for example. The most important component of the boat loader is the telescoping support beam 26, which is shown attached by a pivotal connection 44 to the rear bumper of the carrier vehicle 56. This pivotal connection 44 permits the beam 26 to pivot with only one degree of freedom in a vertical plane which passes essentially through the center line of the vehicle. The opposite end of the support beam 26 is pivotally connected to a bracket 28 which is secured to the bow of the boat 24, by mounting clamps 54. The telescoping beam 20, which is adjustable over a continuous range of length has been locked at a predetermined length corresponding to the distance from the rear bumper connection point 44 to the rear transverse member of the support rack 36 on the vehicle roof.

Figure 9:
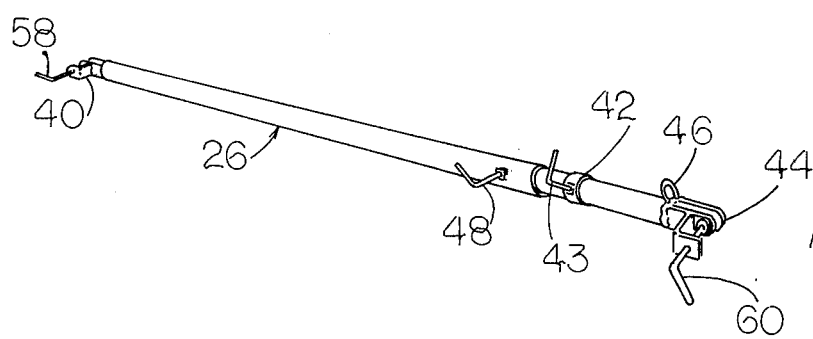

In FIG. 9, the details of the telescoping beam 20 are illustrated. The beam 26 is constructed with a pair of concentric, interfitting, cylindrical tubes which permit the length of the beam 26 to be slidably adjusted. A locking screw 48 is tightened to rigidly fix the overall length of the beam. A slidable stop collar 42 may be locked, by tightening screw 42, at any point on the smaller concentric tube to establish a pre-determined length at which the beam may be repeatably set. When the beam 26 is adjusted and locked at a preselected length corresponding to the height of the carrier vehicle it acts as a rigid restraint to be used in conjunction with a conventional winch 32 and pull rope 34 to raise the boat to the top of the carrier vehicle 22. One person is able to connect the beam 26 and then operate the winch 32 to safely raise the boat by himself. The beam 26 and the pull rope 34 support the boat and the beam 26 restricts the boat from sliding off of the vehicle 22 during the raising or lowering operation.

Additional protection to prevent loss of control of the boat during loading or unloading is provided by using the clamps 64 on the roof top rack which secure the boat for transportation, as guides to maintain the boat on a straight course as it slides forward across the rear member 38 of the rack 36. FIG. 9 also illustrates the details of the pivotal connectors at each end of the beam which utilize slidable pins 58, 60 to engage a mounting bracket 62 on the rear bumper of the carrier vehicle or the mounting brackets on the bow 28 and the stern 30 of the boat.

Figure 2:
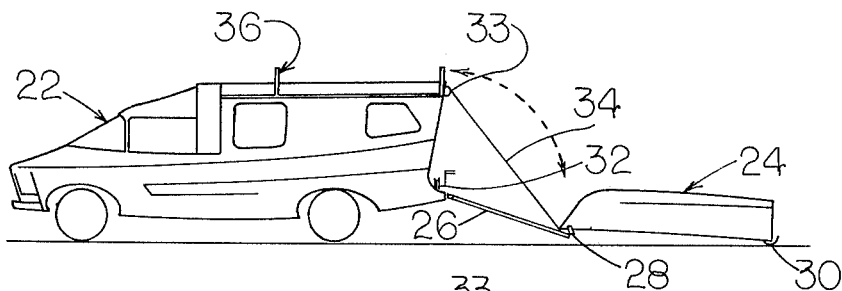
Figure 3:
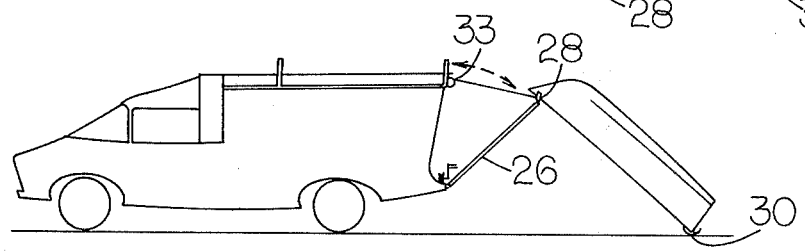
Figure 4:
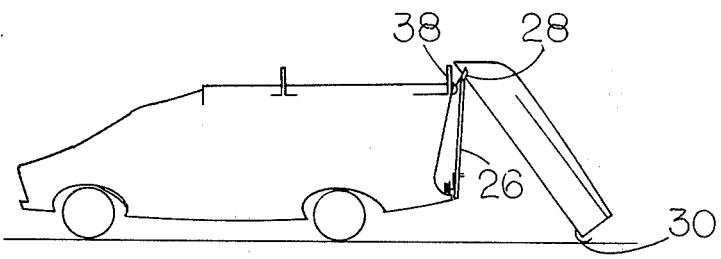
Figure 5:
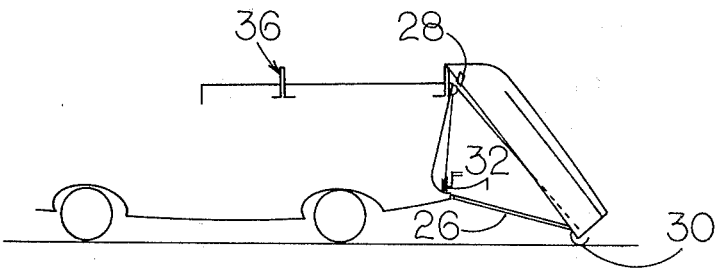
Figure 6:
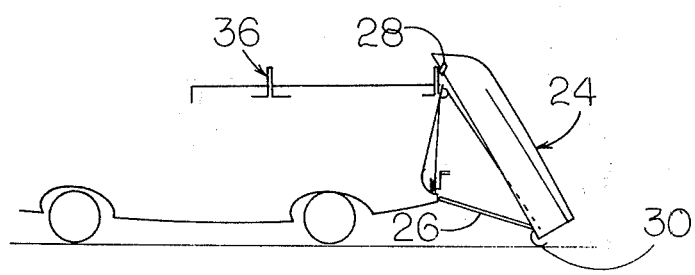
Figure 7:
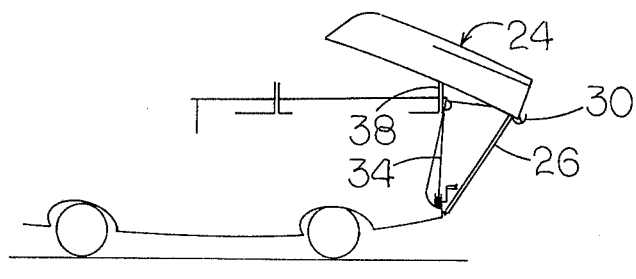
Figure 8:
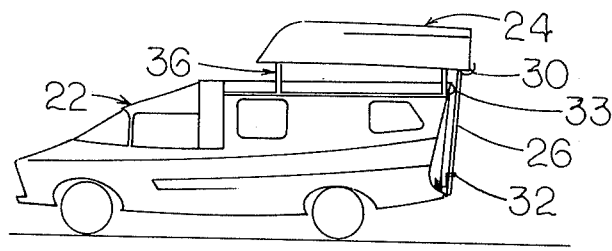

In FIGS. 2 thru 6, the sequence of steps to load the boat is shown. After the beam is connected between the carrier vehicle and the boat as shown in FIG. 2, the pull rope 34 is drawn in by the winch 32. The beam pivots in a vertical plane as shown in FIG. 3, raising the bow of the boat toward the vehicle roof. In FIG. 4, the beam has reached a vertical position, supporting the bow of the boat at the height of the rear transverse member 38 of the boat support rack 36. With the boat bow resting on the support rack 38 the support beam 26 is disconnected from the boat bow bracket 28, unlocked by means of screw 48 and extended as far as necessary to be pivotally connected to the boat stern bracket 30. The stop collar 42 remains locked to mark the precalibrated length selected to just reach the carrier rack 36. The pull rope 34 remains connected to the extended end of the support beam at attachment ring 46. The winch 32 is again used to draw in the pull rope 34, skidding the stern of the boat toward the carrier vehicle 22 and slidably compressing the support beam 26, as shown in FIGS. 5 and 6. When the support beam has contracted to the precalibrated length, marked by the position of the stop collar 42, the locking screw 48 is retightened to again fix the length of the beam. Further operation of the winch 32 raises the stern of the boat as the support beam 22 pivots in a vertical plane as illustrated in FIG. 7, sliding the boat forward across the rear transverse member 38 of the roof top rack 36. The importance of the pre-calibrated fixed length of the support beam 22 is illustrated by FIGS. 7 and 8, which indicate that the beam 22 reaches its vertical orientation just as the bow touches the front transverse member 37 of the conventional roof top rack 36. This causes the boat to be lowered smoothly and also avoids a hard impact of the bow on the roof rack 37.

If the sequence of steps illustrated in FIGS. 2 thru 8 is reversed, the boat is unloaded from the carrier vehicle by one person who never is required to exert himself by lifting or supporting the weight of the boat.

Figure 10:
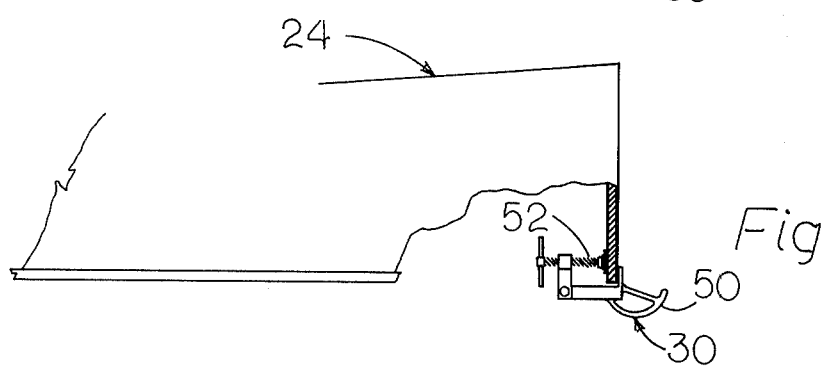
Figure 11:
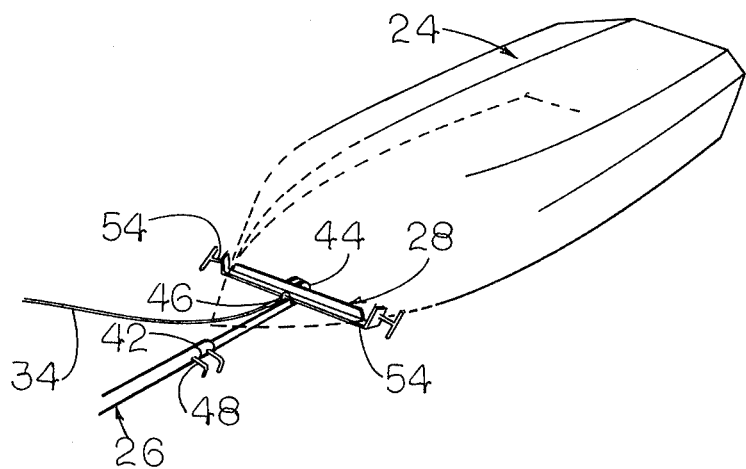

In FIGS. 10 and 11 details of the bow and stern mounting brackets 28, 30 are shown. Attachment clamps are shown for both the bow bracket 54 and for the stern bracket 52. A skid 50 is attached to the stern bracket 30 to slide along the ground as the bow of the boat is raised. In an alternative embodiment, a wheel could be added to the stern bracket 30 in place of the skid 50, and the stern would then roll along the ground.

With appropriate redesign of the mounting brackets 28, 30, this lifting or lowering apparatus 20 could be used to move trail bikes, snowmobiles or other articles between ground level and roof or bed of a carrier vehicle.

SUMMARY OF ADVANTAGES

The boat loader permits one person to safely load or unload a boat from the roof of an automobile or recreational vehicle with no danger of losing control of the boat. This is accomplished by using a supporting beam which is mounted to pivot with only 1° of freedom, in a vertical plane which passes approximately through the center line of the carrier vehicle, acting as a restraint to keep the boat from sliding off of the vehicle. The pivotal beam also acts as a partial support for the boat as it is raised or lowered by a winch operated pull rope. The raising or lowering operation is accomplished with economy of motion and always with adequate support.

A high degree of safety is achieved with a minimum of apparatus, which is adaptable to nearly any boat or carrier vehicle. The boat loader can be used with any conventional roof top rack and is easily installed and calibrated.

I claim:
1. A loading device, to be mounted on the rear bumper of an automobile or other carrier vehicle, for raising a boat from ground level and positioning it on a rack on the roof of said vehicle, operable by one person without requiring him to manually lift or support the weight of the boat, comprising:
   a. a telescoping support beam, adjustable in length, lockable at a fixed, pre-selected length and pivotally connected at one end to the rear structure of a carrier vehicle;
   b. a bracket, to be attached to a boat stern to accept the extended end of the telescoping support beam at a pivotal connection;
   c. a bracket, to be attached to a boat bow to accept the extended end of the telescoping support beam at a pivotal connection; and
   d. a winch and its associated pulleys and pull rope to raise the boat as it is restrained and partially supported by the telescoping support beam.

2. A boat loading device as claimed in claim 1 which also lowers a boat from the vehicle roof support rack to ground level, operable by one person without requiring manual lifting or support of the weight of said boat.

3. A boat loading device as claimed in claim 1, wherein the bracket mountable to the stern of the boat to be connected to the end of the telescoping support beam also has an extended portion acting as a skid as the boat is raised and pulled toward the carrier vehicle.

4. A boat loading device as claimed in claim 1, having one or more wheels connected to the stern mounted bracket to allow the boat to roll forward as the bow is raised to the carrier vehicle support rack.

5. A boat loading device, to be mounted on the rear bumper of an automobile or other carrier vehicle, for raising a boat from ground level and positioning it on a rack on the roof of said vehicle, operable by one person without requiring him to manually lift or support the weight of the boat, comprising:
   a. a telescoping support beam, being slidably adjustable through a continuous range of lengths, having locking means to secure the beam at a desired length, within said range, said beam being a restraint and partial support for a boat during the lifting operation;
   b. pivotal attachment means, securing one end of the telescoping support beam to the rear of a carrier vehicle and permitting only one degree of freedom of motion through a vertical plane;
   c. a bracket, to be attached to the bow of a boat having means to accept the extended end of the telescoping support beam at a pivotal connection;
   d. a bracket, to be attached to the stern of a boat having means to accept the extended end of the telescoping support beam at a pivotal connection; and
   e. a winch and its associated pulleys and pull rope, mounted on structure at the rear of a carrier vehicle, to raise the boat as it is restrained and partially supported by the telescoping support beam.

6. A boat loading device as claimed in claim 5 which also lowers a boat from the vehicle roof support rack to ground level, operable by one person without requiring manual lifting or support of the weight of said boat.

7. A boat loading device as claimed in claim 5, wherein the bracket mountable to the stern of the boat to be connected to the extended end of the telescoping support beam has a portion extending across the boat stern, acting as a skid as the boat bow is raised and pulled toward the carrier vehicle.

8. A boat loading device as claimed in claim 5, having one or more wheels on the stern mounted bracket to allow the boat to roll forward as the bow is raised to the carrier vehicle support rack.

9. A boat loading device as claimed in claim 5, wherein one or more clamps are connected to the vehicle roof carrying rack for securement of the boat during transportation, said clamps also being guides to maintain alignment of a boat as it slides across the carrying rack.

10. A method of raising a boat from ground level and positioning it on top of an automobile or other carrier vehicle which comprises the steps of:
    a. pivotally connecting a telescoping beam, locked at a pre-selected length, to the rear of a carrier vehicle and at its opposite end to the bow of the boat;
    b. raising the bow of the boat to rest on the rear of the carrier vehicle top;
    c. releasing the connection between the beam and the boat bow;
    d. unlocking the telescoping beam and slidably extending it to reach the stern of the boat;
    e. pivotally connecting the extended end of the beam to the boat stern;
    f. drawing the boat stern toward the carrier vehicle, thereby compressing the telescoping beam until it reaches the pre-selected length, corresponding to the height of the carrier vehicle;
    g. locking the beam at its pre-selected length; and
    h. raising the stern of the boat to position the boat on top of the carrier vehicle.

11. A method of lowering a boat from the top of an automobile or other carrier vehicle to ground level, which comprises the steps of:
    a. pivotally connecting a support beam to the rear of a carrier vehicle and at its opposite end to the stern of the boat;
    b. sliding the boat stern toward the rear of the carrier vehicle and lowering said stern to the ground;
    c. releasing the connection between the beam and the boat stern;
    d. sliding the boat stern toward the rear of the carrier vehicle, while the bow is supported by the carrier vehicle top;
    e. pivotally connecting the support beam to the boat bow; and
    f. lowering the boat bow to the ground.

* * * * *